US006368419B1

(12) United States Patent
Daum

(10) Patent No.: US 6,368,419 B1
(45) Date of Patent: Apr. 9, 2002

(54) NON-DESTRUCTIVE OIL RECOVERY METHOD

(76) Inventor: George Kevin Daum, 412 West 17th Avenue, Vancouver, British Columbia (CA), V5Y 2A2

( * ) Notice: Subject to any disclaimer, the term of this patent is extended or adjusted under 35 U.S.C. 154(b) by 0 days.

(21) Appl. No.: 09/302,179

(22) Filed: Apr. 30, 1999

(51) Int. Cl.$^7$ .............................. B08B 3/04; B08B 9/00
(52) U.S. Cl. .................. 134/10; 134/22.17; 134/22.19; 134/26; 134/29
(58) Field of Search ................. 134/10, 4, 26, 134/29, 22.17, 22.19, 40

(56) References Cited

U.S. PATENT DOCUMENTS

| | | | | | |
|---|---|---|---|---|---|
| 5,017,281 A | * | 5/1991 | Sadeghi et al. | ................ | 134/1 |
| 5,678,238 A | * | 10/1997 | Billings et al. | ................ | 134/29 |
| 6,000,412 A | * | 12/1999 | Chan et al. | ............... | 134/22.14 |
| 6,063,206 A | * | 5/2000 | Latta | ............................ | 134/2 |

* cited by examiner

Primary Examiner—Zeinab El-Arini
(74) Attorney, Agent, or Firm—Elbie R. de Kock

(57) ABSTRACT

In the non-destructive recovery of oil or other petroleum hydrocarbon from a contaminated substrate, the hydrocarbon is separated intact from the substrate by applying a hydrocarbon removing agent to the substrate and collecting the hydrocarbon separated from the substrate. The separation of the hydrocarbon is effected by applying a separation agent, such as an alkali, to the substrate to effect adhesion failure of the hydrocarbon, thereby to release the hydrocarbon intact from the substrate and applying a surfactant to suspend the hydrocarbon removed from the substrate. The separation agent and the surfactant collectively constitute the hydrocarbon removing agent which can be applied as an aqueous solution.

10 Claims, No Drawings

NON-DESTRUCTIVE OIL RECOVERY METHOD

FIELD OF THE INVENTION

This invention relates to the removal and recovery of waste oil or other petroleum hydrocarbons from substrates, particularly the non-destructive removal of such waste products.

BACKGROUND OF THE INVENTION

When petroleum hydrocarbons, such as motor oil, brake fluids, heating oils and the like, are deposited on a porous or non-porous substrate, it adheres to the surface. This results in a contaminated substrate with undesirable environmental and commercial effects.

In the first instance, where the contaminated substrate is no longer useful for its original purpose, such as in the case of oil tanks for heating oil, the resulting contaminated material is not recyclable and the used tanks are stored in a dump. If conventional methods and chemicals were to be used to clean the tanks, the resulting hazardous and toxic effluent would need to be incinerated or land filled, which only relocates the pollution.

In the second instance, where the removal and relocation of the substrate is not possible or feasible, such as in the case of driving and parking surfaces for motor vehicles, the petroleum deposits on the surfaces are washed away by rain water or wash water, resulting in pollution. Removal of the accumulated hydrocarbons using conventional methods and chemical degreasers results in chemical mixtures of questionable or undetermined properties that are not recyclable or illegal to discharge. In this instance, the effluent must be relocated, which results in simply transferring the pollution from one location to another. This detracts from the commercial viability of the process.

If a surface has high porosity (such as asphalt), typically a solvent, such as gasoline, kerosene or mineral spirits, can be employed to remove a petroleum hydrocarbon deposit, hereinafter simply referred to as "oil". If adhesion of the oil to the surface has occurred, the solvent must be of sufficient strength to dissolve the oil and penetrate to the substrate. Apart from creating a fire hazard, there are three inherent problems associated with this method. The first is that when attempting to remove refined petroleum hydrocarbon from an asphalt surface, the solvent used must be of sufficient strength to penetrate the surface deposit. As a result, the strong solvent emulsifies a large part of the asphalt along with the deposit and leaves a residue that can become flammable. Technically, this is considered destructive removal, and will contribute to accelerating the breakdown of the asphalt as well as acting as a bond breaker if a coating or sealant is to be applied to the surface after cleaning. The second problem is that the resulting effluent may not be recyclable depending on the solvent. The third problem is that the solvent will disperse the hydrocarbon and leave a residue. It does not suspend the hydrocarbon to allow for removal. In the case of asphalt, a large stain will be apparent after washing, requiring further treatment for removal.

The same problems that occur with the above solvents occur with commercially available degreasers and detergents. However, typically these products are not of sufficient strength to penetrate the oil and thus overcome the adhesion of the oil to the surface.

Acids, bleaches, paint strippers contaminate the waste effluent beyond repair and are not recyclable.

It is an object of the present invention to alleviate the above-mentioned difficulties.

SUMMARY OF THE INVENTION

According to the invention there is provided a method of non destructive recovery of a petroleum hydrocarbon from a contaminated substrate, comprising the steps of separating the hydrocarbon substantially intact from the substrate by applying a hydrocarbon removing agent comprising an aqueous solution of an alkali and a surfactant to the substrate; and collecting the hydrocarbon separated from the substrate.

Also according to the invention, there is provided a method of non destructive recovery of a petroleum hydrocarbon from a contaminated substrate, comprising the steps of separating the hydrocarbon substantially intact from the substrate by applying a hydrocarbon removing agent to the substrate; and collecting the hydrocarbon separated from the substrate, wherein said separating the hydrocarbon from the substrate comprises the steps of applying a separation agent to the substrate to effect adhesion failure of the hydrocarbon, thereby to release the hydrocarbon intact from the substrate; and applying a surfactant to suspend the hydrocarbon removed from the substrate; said separation agent and said surfactant collectively comprising said hydrocarbon removing agent.

Further objects and advantages of the invention will become apparent from the description of preferred embodiments of the invention below.

DETAILED DESCRIPTION OF PREFERRED EMBODIMENT

According to one embodiment of the invention, the recovery of deposited oil or other petroleum hydrocarbons (hereafter generally referred to as "deposit" or "deposits") from paved surfaces for the purpose of recycling, comprises several steps, i.e.:

(i) Penetration of the deposit;
(ii) separation of the deposit from the surface, i.e. effecting "adhesion failure" of the deposit;
(iii) suspension and movement of the deposit; and
(iv) collection and neutralization of the product.

The first two steps are applied to achieve penetration and separation of the deposit from the paved surface without contaminating or damaging the petroleum hydrocarbon. To accomplish this objective, an alkali, such as potassium hydroxide (KOH), in aqueous solution with a surfactant, is used. The concentrations of the alkali and surfactant can be varied depending on the porosity of the substrate and the adhesion level of the petroleum hydrocarbon, as well as the amount of hydrocarbon present. The very properties of refined petroleum that make it useful for lubrication of moving parts, such as high temperature resistance and viscosity, are the same properties which cause the difficulty in penetrating an oil stain to effect adhesion failure. Thus, the use of acids and/or bleaching agents for removing oil stains in conventional methods.

The best way to understand why a cleaning chemical must accomplish all three objectives of penetration, separation, or adhesion failure, and suspension without damaging the petroleum hydrocarbon so that the deposit can be collected and recycled, is to explain first what constitutes a "petroleum hydrocarbon stained substrate" and what does not. A stained paved or driving surface occurs when spilled petroleum hydrocarbon has penetrated and has been allowed sufficient time to adhere to the substrate. If motor oil is spilt on a clean cement surface and immediately scrubbed with household dish washing liquid and water, all or most of the oil can be removed. Recycling of the material would then be a matter of collection, be it recyclable absorbent material, pressure washing, vacuuming or a combination of these methods. In the above situation, adhesion has not occurred and thus the surface is technically not stained. When the substrate is stained, a bond or adhesion occurs between the oil and the surface. If the same motor oil is spilt and left for several days, the oil has time to penetrate the surface and adhere or bond. If it is attempted to clean this same surface with household dish washing liquid and water, only the surface oil is removed. The same is true for the majority of commercially available degreasers. This is why acid washing has become the preferred method of oil stain removal in conventional methods.

The present method of causing adhesion failure to occur, comprises adjusting the amount of alkali in the cleaning agent according to the substrate and allowing an appropriate dwell time so that the agent can penetrate the hydrocarbon stain. This process can be accelerated by increasing the concentration of the alkali component in the cleaner, as well as using mechanical means, such as increasing the application pressure of the cleaning equipment as well as the water temperature, since neither mechanical attack or hot water is not sufficient on its own. The alkali component of the cleaner is adjusted from about 1% to about 50% of by volume of the total volume of aqueous solution containing the alkali and the surfactant.

The third step comprises suspension of the hydrocarbon and movement of the resulting suspended hydrocarbon and cleaner emulsion. When the bond between the petroleum hydrocarbon and the substrate is successfully broken, collection of the oil becomes possible. Typically, pressure washing is employed to move the oil to collection material or equipment and/or it is flushed down the drain. However, during this procedure, oil may disperse over a large area and leave a large stain or residue. This stain increases in direct proportion to the porosity of the substrate. To avoid this problem, the cleaning agent also comprises a surfactant or suspension agent that suspends the oil so that it can be moved without settling back onto the surface. The surfactant may comprise an enzyme based ionic surfactant. The concentration of the surfactant is adjusted according to the substrate so that the oil droplets do not coalesce in portions large enough to be re-deposited on the surface. The amount of surfactant must be increased in proportion to the porosity of the surface and the amount of hydrocarbon. The objective is the suspension of the hydrocarbon. In most field applications the percentage of surfactant is between 1 and 5% by volume of the aqueous solution i.e. about 1% for a low porosity surface, about 3% for a medium porosity surface and about 5% for a high porosity surface. The amount of surfactant can be adjusted on location as required by the person doing the work. The higher the percentage of surfactant the greater the suspension capacity. If desired, the cleaning agent may comprise more than one surfactant.

The fourth step comprises collection and neutralization of the emulsion. Neutralization is necessary when the alkali portion of the cleaner is too high for discharge. Neutral pH is considered to be between 7 and 7.5. When the emulsion is neutralized, the resulting material is petroleum, hydrocarbon, salt and water. The objective of this part of the process is to collect the hydrocarbon in such a manner that it can be recycled. Assuming the hydrocarbon was not damaged or contaminated in the previous steps, the hydrocarbon can be collected by using absorbent material that can be blended into the emulsion and/or by using absorbent material that can be cleaned and reused. In the case where an oil and water separator is available or the effluent is vacuumed and collected, it can be placed directly into this equipment for separation and recycling.

Generally, paved surfaces fall into three main categories:

(a) Asphalt, being typically a driving surface composed of a combination of low grade petroleum obtained as residue in the refining process and aggregate of varying mass.

(b) Cement type surfaces, either poured in place or prefabricated and installed. This category primarily includes bricks, pavers, cement and concrete slabs.

(c) Traffic membrane which is not to be confused with sealers. Traffic membranes are typically combinations of epoxies and/or urethanes that are overlain on top of other driving surfaces for the purpose of waterproofing and abrasion resistance.

A more detailed description of the process for each of the above surface types is given below. In the following description the hydrocarbon is referred to as "oil".

(a) Asphalt: On older asphalt, a stronger mixture of oil remover can be used (35 to 50% by weight KOH) to penetrate the oil. On newer asphalt, 20% KOH is sufficient. The cleaner is applied to the stained area and allowed to dwell for 20 to 40 minutes. When the alkali portion of the cleaner has penetrated to the surface and caused adhesion failure, the enzyme based surfactant will suspend the oil. Sufficient dwell time can be identified when a stain can be wiped clean and the cleaning solution under the oil is not saturated with oil. At this point, depending on the collection method the resulting effluent or emulsion can be neutralized. The surfactant component of the cleaner will still suspend the oil. To increase production speed, a mixture of 1% KOH can be sprayed on the parking lot surface. This simply assists in moving the waste oil over the surface. However, prior to discharge of the effluent, pH levels need to be tested. Ideal pH is between 7 and 7.5. The majority of the oil can be collected at the stain by using absorbent material that can be blended with the effluent or cleaned and/or vacuuming and then separating the oil for recycling. For production purposes, using a pressure washer to move the effluent to a centralized collection area is generally preferable. The neutralized effluent can also be flushed into an oil water separator as the cleaning agent has not contaminated the waste oil.

(b) Cement: Depending on the porosity of the surface, the alkali component of the cleaner is adjusted to between 10 and 20% by weight. The dwell time of the cleaner is between 15 to 40 minutes. The cleaning method is the same as for asphalt, except that the surfactant does not need to be pre-sprayed on the rest of the surface due to the lower porosity of the surface.

(c) Traffic membranes: If adhesion has occurred, typically a dilution of 2 to 10% by weight of KOH is sufficient to cause adhesive failure and suspension. At this point, the same cleaning method as above applies.

The method of wiping the surface to test for sufficient dwell time ascertains whether all the required steps have been effected, excluding moving, collecting and recycling. On asphalt, the cleaner will suspend the oil and the cleaner will be the same colour and texture as unused cleaner and the asphalt will be slippery and will not emulsify in the chemical. A stronger cleaner or chemical will emulsify the asphalt and the mixture will be black. A weaker mixture will not penetrate and again the mixture will be black. On cement and traffic membranes, the same effect applies. The substrate can be inspected visually. If a cleaner is to strong, etching or damage to a membrane can occur, this will contaminate the waste effluent and negate the process.

While only preferred embodiments of the invention have been described herein in detail, the invention is not limited thereby and modifications can be made within the scope of the attached claims.

What is claimed is:

1. A method of non destructive recovery of a petroleum hydrocarbon from a contaminated substrate, comprising the steps of:

applying a hydrocarbon removing agent to the substrate whereby the hydrocarbon is separated from the substrate in a form permitting recycling of the hydrocarbon; and collecting the hydrocarbon separated from the substrate, wherein separating the hydrocarbon from the substrate comprises the steps of:

applying a separation agent to the substrate to effect adhesion failure of the hydrocarbon, thereby to release the hydrocarbon intact from the substrate; and applying a surfactant to suspend the hydrocarbon removed from the substrate;

and wherein said hydcarbon removing agent comprises said separation agent and said surfactant.

2. The method according to claim 1, wherein the separation agent and the surfactant are applied to the substrate as a mixture constituting said hydrocarbon removing agent.

3. The method according to claim 2, wherein the substrate is porous and the surfactant is added to the mixture constituting said hydrocarbon removing agent in an amount which is proportional to the porosity of the substrate.

4. The method according to claim 1, wherein the separation agent comprises an alkali in aqueous solution, which aqueous solution also contains the surfactant.

5. The method according to claim 4 wherein the alkali comprises potassium hydroxide.

6. The method according to claim 4, wherein the alkali is present in an amount of from about 1% to about 50% by volume of the total volume of the aqueous solution.

7. The method according to claim 1, wherein the surfactant comprises an enzyme based surfactant.

8. The method according to claim 1, wherein said substrate comprises a motor vehicle parking lot surface.

9. The method according to claim 1, wherein said substrate comprises a surface of an oil tank for heating oil.

10. The method according to claim 1, further comprising the step of recycling the hydrocarbon separated from the substrate.

* * * * *